United States Patent [19]

Mueller et al.

[11] Patent Number: 5,039,414

[45] Date of Patent: Aug. 13, 1991

[54] PROCESS FOR SEPARATING AND/OR RECOVERING HYDROCARBON OILS FROM WATER USING BIODEGRADABLE ABSORBENT SPONGES

[76] Inventors: Marc B. Mueller, 48 Fairlawn Ave., South Portland, Me. 04106; Karl J. Marean, R.D. 1 Box 555, North Whitefield, Me. 04353

[21] Appl. No.: 387,825

[22] Filed: Aug. 1, 1989

[51] Int. Cl.$^5$ ............................................. C02F 1/28
[52] U.S. Cl. .................................. 210/610; 134/6; 210/680; 210/691; 210/922; 210/924
[58] Field of Search ............... 134/6, 9; 210/680, 691, 210/922, 924, 611, 610

[56] References Cited

U.S. PATENT DOCUMENTS

| | | | |
|---|---|---|---|
| 243,685 | 7/1881 | Brooks . | |
| 2,000,042 | 5/1935 | Sheppard et al. | 87/7 |
| 2,381,752 | 8/1945 | Iler | 106/125 |
| 2,465,357 | 3/1949 | Correll | 106/122 |
| 2,558,395 | 6/1951 | Studer | 167/65 |
| 2,610,625 | 9/1952 | Sifferd et al. | 128/156 |
| 3,157,524 | 11/1964 | Artandi | 106/122 |
| 3,368,911 | 2/1968 | Kuntz et al. | 106/155 |
| 3,464,920 | 9/1969 | Pirson et al. | 210/680 |
| 3,494,423 | 2/1970 | Stansbury et al. | 169/2 |
| 3,580339 | 5/1971 | Nance | 169/2 |
| 3,591,524 | 7/1971 | Eriksen | 252/427 |
| 3,598,729 | 8/1971 | Baumann | 210/40 |
| 3,617,564 | 11/1971 | Vander Hooven | 210/40 |
| 3,617,565 | 11/1971 | Fahlvik | 210/40 |
| 3,632,361 | 1/1972 | Battista | 106/122 |
| 3,677,982 | 7/1972 | Marx | 260/2.5 R |
| 3,681,237 | 8/1972 | Orban et al. | 210/680 |
| 3,739,991 | 6/1973 | Bogosian | 210/242 |
| 3,769,164 | 10/1973 | Azarowicz | 195/2 |
| 3,791,990 | 2/1974 | Fischer | 252/427 |
| 3,823,212 | 7/1974 | Cvapil | 264/49 |
| 3,843,517 | 10/1974 | McKinney et al. | 210/11 |
| 3,870,599 | 3/1975 | Azarowicz | 195/2 |
| 3,871,956 | 3/1975 | Azarowicz | 195/2 |
| 3,871,957 | 3/1975 | Mohan | 195/2 |
| 3,915,855 | 10/1975 | Teng et al. | 210/30 |
| 3,962,083 | 6/1976 | Goldman | 134/9 |
| 3,986,959 | 10/1976 | Bagot et al. | 210/924 |
| 4,013,585 | 3/1977 | Terajima et al. | 210/680 |
| 4,039,489 | 8/1987 | Fletcher et al. | 260/2.5 AD |
| 4,284,509 | 8/1981 | Lindorfer et al. | 210/610 |
| 4,404,134 | 9/1983 | Becker et al. | 260/112.5 R |
| 4,412,947 | 5/1982 | Cioca | 260/123.7 |
| 4,415,661 | 11/1983 | Thirumlachar et al. | 435/174 |
| 4,415,662 | 11/1983 | Thirumalachar et al. | 435/176 |
| 4,439,324 | 3/1984 | Crotti | 210/691 |
| 4,460,156 | 6/1987 | Grenthe | 210/691 |
| 4,497,688 | 2/1985 | Schaefer | 162/181.1 |
| 4,497,712 | 2/1985 | Cowling | 210/691 |
| 4,497,930 | 2/1985 | Yamasaki et al. | 524/556 |
| 4,537,877 | 8/1985 | Ericsson | 502/402 |
| 4,670,156 | 6/1987 | Grenthe | 210/691 |
| 4,789,401 | 12/1988 | Ebinger et al. | 106/122 |
| 4,818,534 | 4/1989 | Levu | 424/404 |

OTHER PUBLICATIONS

Sorbert Products Company, Inc. Bound Brook, N.J. The SPC Solution Product Information Sheet.

*Primary Examiner*—C. Ivars Cintins

[57] ABSTRACT

An improved process for absorbing oils and especially separating and recovering oils from an aqueous medium or aqueous/wetted medium using an absorbent oleophilic biodegradable sponge material comprised of essentially fat-free, foamable natural products, specifically animal proteins or plant polysaccharides, such as gelatin, collagen, egg white albumen, gum agar, gum arabic, gum karaya, and locust bean gum, which absorb oils at a rate of at least about 30 times their weight.

15 Claims, No Drawings

PROCESS FOR SEPARATING AND/OR RECOVERING HYDROCARBON OILS FROM WATER USING BIODEGRADABLE ABSORBENT SPONGES

BACKGROUND OF THE INVENTION

This present invention relates to the use of absorbent sponge-like materials made from essentially fat-free foamable natural products such as animal proteins and plant polysaccharides, which products are biodegradable and capable of attracting and retaining oils, especially hydrocarbon oils and hydrocarbon fuels, and to the removal of such oils and fuels from aqueous media, or aqueous-wetted surfaces. The need for such methods, in association with cleanup efforts for the marine environment, is readily apparent in view of the high incidence of offshore oil spills and the ineffectiveness of many known cleanup methods. Similarly, significant offshore water pollution may be caused by shipping vessels and oil tankers as they routinely clean out the dregs of their holding tanks and bilges into the open water. Furthermore, under or aboveground storage tank facilities, and other land-based sites which store and maintain fuel and other hydrocarbon oils, often leak or spill their contents resulting in ground water and/or water table contamination.

This invention also relates to the absorption of oils, including hydrocarbon oils and fuels in areas wholly unrelated to petroleum spill cleanup and recovery. The present invention is equally effective for any operation requiring the separation or absorption of any hydrocarbon oil or fuel from any aqueous media or aqueous-wetted surface such as the sand or rocks that occur at a shoreline.

The need for a complete, workable solution to the recurrent problem of oil spill and other hydrocarbon oil contamination to inland waterways, oceans and shorelines has led to the discovery of numerous devices and processes aimed at oil spill recovery and containment. Unfortunately, most of the devices or processes known in the art fail to achieve this goal. While some oil containment operations may immobilize and sink floating offshore contaminants, such a remedy does not adequately address the subsequent harm caused to the surrounding environment as well as the ocean floor. Similarly, while many known processes and devices facilitate the immobilization and incineration of floating nonpolar contaminants, the concomitant air pollution is seldom an acceptable side effect.

Recently, oil "digesting" bacterial, yeast and fungal microorganisms have been applied to assist in oil spill biodegradation. The use of these organisms for petroleum biodegradation is disclosed, inter alia, in U.S. Pat. Nos. 3,769,164; 3,870,599; 3,843,517 and 3,871,956. However, these organisms work slowly, if at all, in most marine environments. Such organisms often require substantial oxygen to metabolize oils and it is often impossible to satisfactorily oxygenate an entire surface spill. In addition, many of these organisms work best, if at all, on placid bodies of water. Often, small wave action is enough to impair any significant amount of "digestion". Therefore, the use of such microorganisms is often impractical for the treatment of spills.

The present invention further represents a significant unexpected advancement in the field over current environmentally acceptable methods for oil recovery or separation from an aqueous/hydrocarbon oil admixture.

There are currently few environmentally acceptable methods designed to remedy contamination of the subsurface due to leakage of hydrocarbon oils and hydrocarbon fuels from underground storage tanks. One such method requires flushing large amounts of fresh water down to the water table in an effort to entrain liquid contaminants that have not yet reached the water table, while drawing up contaminated water from the water table, concomitantly distilling off or otherwise separating out pure water from the contaminant, and then returning the purified water to the water table. The drawing up, purification and return cycle must be repeated at length, typically over the course of many years, until the concentration of contaminants in the water at the water table has fallen to environmentally acceptable levels.

The removal of hydrocarbon oils and other oil contaminants is further complicated when recovery and reuse of the contaminant, as well as its containment, is sought. Many containment processes and devices render recovery and reuse of the contaminant impossible; either because the contaminant is in a state of total or partial degradation, or the contaminant cannot be easily extracted from the absorbent means used in the chosen process.

Early suggestions for absorbing oils from liquid and solid surfaces involved the use of natural cellulose-containing materials such as sawdust, corn cobs, tree bark, and wood pulp to soak up the oil or other contaminant. The use of a natural product materials held in a netting or liner to absorb, and then remove, a contaminant has been disclosed. For example, U.S. Pat. No. 4,497,712 suggests an absorbent "pillow" designed to absorb chemical solutions and hydrocarbons from either solid or liquid surfaces. The "pillow" is filled with ground corn cobs which are made of an organic cellulose material. The use of dried bark from certain species of trees, held together in a tubular netting is suggested in U.S. Pat. No. 3,617,565. The "bark-in-netting" device is designed to absorb a variety of insoluble petroleum products from either a water or solid surface. U.S. Pat. No. 4,439,324 suggests bird feathers in mesh bags to effect removal of oil from the surface in open water. The use of many of these natural products is not practical or even feasible for widespread industrial use.

Fibrous cellulosic material, and especially fibrous cellulosic residues from paper-making or pulp-making has also been suggested to absorb oils and other hydrocarbons. U.S. Pat. No. 4,670,156 suggests this fibrous absorbent material can be used both in onshore and open water applications. Common cellulose sponge, such as household sponge may be esterified with one or more fatty acid esters and thereby rendered lipophilic so that it will absorb up to 10 times its weight of oily material, according to U.S. Pat. No. 3,915,855. Another patent, U.S. Pat. No. 3,677,982 suggests the use of a cellulose sponge pretreated with an unsaturated compound such as styrene or an acrylic compound and an organic peroxide to absorb floating petroleum oil from a water surface.

U.S. Pat. Nos. 3,632,361 and 4,412,947 disclose hydrophilic absorbent collagen mats and sponges, some of which are said to absorb 50 times their weight of water. A process for making collagen sponges is also disclosed in U.S. Pat. No. 3,823,212. Gelatin has been disclosed as a component for hydrophilic surgical sponge in U.S. Pat. No. 2,465,437.

Various synthetic products in various forms, such as polystyrene, polypropylene, etc. have been known and used as an absorbent for oil collection. However, the nonbiodegradability of these substances, as well as the difficulty of contaminant recovery from these synthetics, which inhibits the subsequent reuse of the collected contaminants, poses a significant obstacle which this invention seeks to overcome.

As evidenced by the aforementioned patents, and others, the use of collagen and gelatin sponges has been widely recognized in the medical field for many years.

The present invention uses the sponges made from various essentially fat-free foamable natural products such as animal proteins and plant polysaccharides, preferably collagen and gelatin, to absorb oils, especially hydrocarbon oils and other hydrocarbon fuels from an aqueous medium or aqueous-wetted surface to the extent of at least about 30 times their own weight, preferably at least about 50 times their weight. Other animal proteins and plant polysaccharides which are contemplated to be used include egg white albumen, vegetable gums such as gum agar, gum arabic, gum karaya, locust bean gum, and the like.

This discovery is most unexpected in view of the earlier disclosures which emphasized the hydrophilic properties of such sponges. It was not thought that such sponges would display an equal or greater absorbency preference for oils, especially hydrocarbon oils and other hydrocarbon fuels, over that for water.

BRIEF DESCRIPTION OF THE INVENTION

The present invention relates to the use of sponges made from various natural products to absorb oils, especially hydrocarbon oils and other hydrocarbon fuels from aqueous media, aqueous-wetted surfaces and other surfaces. Preferred embodiments of the sponge, in accordance with the invention, are animal proteins and plant polysaccharides The sponges are highly absorptive, completely biodegradable and exhibit hydrophobic and oleophilic characteristics and thus are valuable environmental cleanup tools. Most preferred among the animal protein sponges are the gelatin and collagen varieties. Also contemplated for use as sponges in accordance with the invention is egg white albumen, an animal protein and plant polysaccharides such as gum agar, gum arabic, gum karaya and locust bean gum. The gelatin sponge is able to remain afloat on an aqueous surface for at least two days while preferentially absorbing various oils, especially hydrocarbon oils and other fuel contaminants. According to this invention, sponges as described above, and especially those comprised of collagen also absorb hydrocarbon oil and hydrocarbon fuel contaminants from an aqueous-wetted surface such as, for example, a rocky or sandy shore.

In accordance with the invention, the sponges separate and absorb oils from an agitated aqueous admixture. The sponges used in accordance with this invention absorb the oils, especially hydrocarbon oil or hydrocarbon fuel contaminants at a rate of at least about thirty and preferably at least about fifty times their own weight and may be fashioned into mats, wipe cloths, pads or the like, and may also be initially formed in situ from a fluid foam that solidifies into a sponge-like mass.

Recovery and reuse of the absorbed contaminant may be effected by squeezing or other physical compression means. However, the sponges will also retain the contaminant absorbed within their structure if not compressed, and the saturated sponge may itself be used as a fuel source through its subsequent incineration.

Alternatively, various bacterial, yeast and fungal microorganisms capable of oil biodegradation may be seeded within the sponges in accordance with the invention prior to contact with the contaminant. Further, the contaminant-saturated sponges may also be brought into contact with suitable microorganisms after absorption occurs.

According to this invention, the contemplated sponge devices may be manufactured, by any known sponge-making process in the art, into any desired shape of any desired dimension, and may be used either alone, or strung or bundled together to absorb hydrocarbon oil or hydrocarbon fuel contaminants from either aqueous media or aqueous-wetted surfaces, such as e.g., a sandy or rocky beach or shoreline.

According to this invention, the described sponges may also be used to absorb oils, especially hydrocarbon oils from a floor, fuel tank joint, or other piece of machinery, etc. In short, wherever excess, unwanted oil or fuel exists, the described sponges will, in accordance with the invention, satisfactorily absorb the oily contaminant.

DETAILED DESCRIPTION OF THE INVENTION

This present invention relates broadly to the use of biodegradable oleophilic, absorbent, sponges made from various essentially fat-free, foamable natural products, such as various animal proteins and plant polysaccharides for separation of oils, especially hydrocarbon oils and fuels from aqueous media or for absorbing such oils. In accordance with the invention, it has been discovered that the sponges made from such substances, preferably gelatin and collagen, have an unexpected affinity and preference for absorbing hydrocarbon oils and other hydrocarbon fuels from an aqueous admixture at a rate of at least about thirty times their weight and preferably at least about fifty times their weight. The gelatin sponge will remain afloat an aqueous surface for at least two days. Among other animal proteins that may be fashioned into a sponge is egg white albumen. Also contemplated are plant polysaccharides, such as gum agar, gum arabic, gum karaya, and locust bean gum.

In accordance with this invention, the sponges work equally well in separating and removing said oils, especially hydrocarbon oil or other hydrocarbon fuels from either static or other agitated aqueous media or from aqueous-wetted surfaces. Such agitation of an aqueous, hydrocarbon oil or hydrocarbon fuel admixture often occurs due to wind or tidal interaction with aqueous surfaces in various bodies of water. Agitation may also be caused by the interaction of the topography of the floor under the body of water with various water currents such as e.g., a shallow rocky river bed causing white water rapids. Such agitated aqueous conditions frustrate oil and other fuel cleanup efforts when using conventional known recovery methods.

While the oleophilic characteristics of the sponges can be enhanced by including a pretreatment step during manufacture of the sponges, which incorporates selected water repellent substances such as silicones and fatty acid esters with carbon chains $C_8$–$C_{18}$ in length, to make them more hydrophobic and assist in duration of flotation on an aqueous surface, this is not essential. After the sponges have been contacted with the oils, hydrocarbon oil or hydrocarbon fuels sought to be absorbed, for a sufficient period of time to reach their maximum absorbency, the saturated sponges may be collected and the absorbed contaminant may be recovered from them by simple squeezing, or other physical compression means. If desired, the sponges, saturated with oily hydrocarbon contaminant, may instead be used and consumed as a discreet fuel source.

In accordance with this invention, sponges may be deployed in an amount known to be in excess of the calculable amount needed to absorb a particular spill or other contamination. After all of the contaminant present has been absorbed, any sponges which have not been collected from their deployed location, and which have not absorbed any contaminant, will not exacerbate the environmental problem since they are completely biodegradable in their natural state.

It is further contemplated to use the saturated sponges as a new substrate on which known biodegrading microorganisms may be grown. Various bacteria (*Nocardia opacus, Nocardia corallina, Nocardia farcinica, Achromobacter centropunctatum, Bacterium aliphaticum, Bacteria benzoli*, etc.) yeasts (*Candida parapsilosis, Candida tropicalis, Candida utilis, Saccharomyces cerivisiae*, etc.) and fungi (*Aureobasidium pullulans, Myrothecium verrucaria, Cladosparium cladosporioides, Actinomucor elegans, Geothrichium marinum*, etc.) are known for their biodegradative capabilities. However, the need to adequately oxygenate the area to which microorganisms such as these are applied has deterred their widespread use for oil and other petroleum cleanup operations. In addition, many of the organisms will not work well in cold water temperatures or when water conditions are anything other than placid, further making their widespread industrial use impractical. Alternatively, the sponges in accordance with the invention may be seeded with such microorganisms prior to contact with the contaminants sought to be removed. Once the contaminants have been absorbed, these microorganisms seeded within the sponges begin to biodegrade the absorbed oils, hydrocarbon oils and hydrocarbon fuels, converting them to non-environmentally harmful products through mechanisms well-known in the art. Since the contaminant is "broken-down" or biochemically converted, the use of such microorganisms in combination with the sponges is only contemplated when reuse of the absorbed contaminant is not desired.

The sponges are manufactured from the aforementioned animal proteins, preferably gelatin and collagen, according to spongemaking methods and processes known in the field, such that sufficient air spaces or matrices are created in the sponges enabling them to achieve the desired rate of absorption. Techniques such as "freeze-drying", and various chemical processes have been known in the art and used in the preparation of collagen and gelatin sponges for various medical applications. Such sponge preparation methods are disclosed in detail in U.S. Pat. Nos. 2,465,357; 2,610,625; and 3,368,911.

In accordance with this invention, the sponges may be made of any configuration or dimension desired, such as squares, mats, foams, pads, rectangles, spheres, etc., and may be deployed either alone or in combination with one another. The sponges may be strung together in mesh bags, liners or netting to facilitate their collection. The sponges may be placed inside a porous netting and further made to operate as an oil absorbing boom. In addition, the oleophilic properties of the sponges enable either a single sponge or sponges in combination to be brought into contact with oils, especially hydrocarbon oils or hydrocarbon fuel contaminants on an aqueous-wetted surface interface, such as a rocky shoreline or sandy beach, or further along the edge of any type of waterway.

The sponges may even be used individually as an oil "wipe cloth". As mentioned previously, the unexpected affinity for hydrocarbon oils and other fuels over that of water makes these sponges extremely useful for a variety of applications, even where water may, or may not be present. An illustration of such an application is use of the sponge for absorption of oil or oily residue, such as often occurs on a garage mechanic's floor, or on an automotive engine during repair. The sponges in their pad or mat form may wrap around machinery or rest on floors where oil or oily residues are expected to appear thus acting as a preventative absorbent system. This would serve to keep a work or home environment much safer by removing a slippery or otherwise potentially hazardous pool of possibly flammable oil.

It is also contemplated that the process of this invention could be used effectively and inexpensively as a cleanup means by which harbors, marinas, docks, etc. could regularly maintain a pollution-free environment. In accordance with the invention, the sponges could be routinely applied to the polluted waters that ordinarily contain a noticeable degree of marine vessel surface pollution. The sponges could also be attached to docks and pilings and absorb contaminants from the surrounding waters, then be periodically replaced as they become saturated with the contaminant.

It is further contemplated that the process of this invention could be used as a cleanup tool on land by lowering the sponges into a well or borehole at a contaminated site so that the sponges come in contact with the hydrocarbon-contaminated water present in the water table. In accordance with the invention, such sponges may be lowered to the water table, down through the borehole by any known physical means. After the sponges have been in contact with the contaminated area for a sufficient time to absorb the maximum amount of hydrocarbon contaminant possible, the sponges are then brought up and can be disposed of. This direct removal of hydrocarbon contaminant from the water table would significantly shorten the amount of time and expense otherwise required to remove such a contaminant that has reached the water table.

Another aspect of this invention features the ability to partially impregnate, or pretreat the sponges with a chemical or natural agent, such as e.g., tar remover comprising a liquid aromatic hydrocarbon or mixture thereof, which may assist in the absorption or chemical breakdown of the contaminant to be collected. Use of adjuncts such as this may be helpful to partially decompose the contaminant before its absorption.

As has been mentioned previously, recovery of the contaminant in a usable form can be effected by physical compression, such as squeezing the sponge.

The invention further contemplates the in situ formation of a sponge over large aqueous-wetted, or other surface areas by initially applying the animal protein or plant polysaccharide in a hardenable foam-like form. The foam would solidify in situ upon contact with air, or the contaminated aqueous medium, or an aqueous medium/aqueous-wetted surface interface, such as a shoreline, to form a sponge. Such foams may be dispensed in a manner known in the art, whereby a compressed liquid is propelled onto a desired surface and forms a solid phase with sufficient air space matrices to be absorbent to a desired degree. Such a means of conducting the process of the invention would be especially useful in an attempt to quickly contain, absorb, and thereby clean up an ocean oil spill, whereby such dispensing of the foam could conceivably be effected from a boat, or hovering helicopter or other aircraft. Such aerial application of a foam-type substance for uses such as fire-fighting are suggested in U.S. Pat. Nos. 3,494,423 and 3,580,339.

The following examples are presented as further illustrations of the details of this present invention and only illustrate preferred embodiments of the invention.

EXAMPLE 1

Preliminary saturation limits for the various types of sponges were determined by adding various oils and other hydrocarbon fuels to a tray containing only the absorbent sponge material listed. Saturation efficiency levels were noted in Table 1.

TABLE 1

| Sponge Type | Sponge Mass (g) | Oil Type | Oil Density (g/cc) | Oil Absorbed (g) | Efficiency (oil absorbed sponge mass(g)) |
| --- | --- | --- | --- | --- | --- |
| Collagen | 0.16 | Chain saw oil | .94 | 12.4 | 77 |
| Collagen | 0.19 | Transmission fluid | .80 | 15.0 | 79 |
| Collagen | 0.19 | " | .80 | 16.7 | 88 |
| Gelatin | 0.10 | Chain saw oil | .94 | 6.7 | 67 |
| Gelatin | 0.14 | Asphalt | .9 | 6.2 | 44 |
| Gelatin | 0.14 | #2 oil (Diesel) | — | 12.1 | 86 |
| Cellulose (Control for comparison) | 0.55 | Chain saw oil | .94 | 4.0 | 7 |

EXAMPLE 2

An artificial wave motion machine was applied to a tray of sea water generating ½-¾ inch high waves. Various oils noted below in Table 2 were added.

TABLE 2

| Sponge Type | Sponge Mass (g) | Oil Absorbed (g) | Oil Type | Efficiency (oil absorbed(g) sponge mass(g)) |
| --- | --- | --- | --- | --- |
| Gelatin | .1 | 7.2 | Chain saw | 72 |
| Gelatin | .1 | 7.2 | Chain saw | 72 |
| Gelatin | .04 | 4.3 | 10w40 | 107 |
| Collagen | .04 | 3.2 | 10w40 | 80 |

Saturated sponges exhibited a darkened color appearance and a solid gel-like consistency serving to maintain their buoyancy, and making them easily removable and recoverable from the surface of the water.

EXAMPLE 3

The natural buoyancy capabilities of the gelatin sponge were tested by placing a gelatin sponge in sea water. After two hours the sponge was inspected and did not appear wet.

A small amount of 10W 40 oil was then added to determine whether the gelatin sponge would still absorb oil. The oil was visibly absorbed within minutes, but no exact weight or time measurements were taken.

EXAMPLE 4

A simulated shoreline/ocean interface environment was created by adding approximately 30 ml of chain saw oil to a small plastic tray containing sea water, sand and rocks. The tray and its contents were agitated so as to create a wave-like motion. The first gelatin sponge weighing 0.2 grams was added. After thirty minutes oil had noticeably penetrated the sponge. Oil was also seen on the sand and rocks. The first gelatin sponge was removed and two more gelatin sponges were added, each weighing 0.2 grams. After continuing the agitation for approximately one hour, these two gelatin sponges were removed and a fourth gelatin sponge weighing 0.3 grams was added. The system was agitated for an additional two hours. The agitation was then stopped and the fourth sponge was allowed to remain in the aqueous system for an additional 17 hours. The fourth gelatin sponge was then removed and the four sponges were weighed together. The total weight was 32.6 grams, or approximately 31.7 grams of oil had been absorbed. Almost all of the oil had been visibly removed from the system.

EXAMPLE 5

Tar remover (2.4 grams) was added to a gelatin sponge weighing 0.14 grams. This amount was below the saturation level of the gelatin sponge. The soaked sponge was then placed in a solution comprised of 45 grams of sea water and 3 grams of asphalt. After 30 minutes, asphalt was penetrating the gelatin sponge. Four semi-circles of asphalt-free water could then be seen. After 90 minutes, the gelatin sponge was removed and weighed at 5.4 grams. No water appeared to have been absorbed by the sponge. Therefore, the sponge absorbed an estimated 2.86 grams of asphalt, or, 95% of all available asphalt present in 90 minutes.

| Calculation: | |
| --- | --- |
| Total weight | 5.40 g |
| −sponge | −0.14 g |
| −tar remover | −2.40 g |
| Total Asphalt Absorbed | 2.86 g |

The first sponge was removed, and a second gelatin sponge also weighing 0.14 grams was added after soaking it with 2.4 grams of tar remover. After three hours, the second sponge showed signs of absorbing the remaining asphalt. The second sponge remained in the solution for a total of 18.5 hours at which time the sponge was removed and weighed. The total weight of the second sponge was 4.1 grams. Since only 0.14 grams of asphalt was left unabsorbed by the first sponge, it was determined that at least 1.5 grams of the total weight in sponge #2 was water. At twenty hours, the remaining solution left unabsorbed weighed 41.8 grams.

| Calculations: | |
|---|---|
| Starting weight (asphalt/water) | 48.00 g |
| + Weight added | + 5.08 g |
| (for remover/sponges) | 53.08 g |
| − Weight removed | −9.40 g |
| (asphalt/sponge/water) | 43.68 g (Theoretical Weight) |
| − Weight remaining in tray | −41.80 (Actual weight) |
| Difference | 1.88 g |

One gelatin sponge weighing 0.14 grams was added to 51 grams of sea water and 3.2 grams of asphalt. No tar remover was added to the gelatin sponge. The sponge was removed after 17 hours and weighed at 3.9 grams. The unabsorbed asphalt was polymerized and removable as one piece weighing 0.5 grams. Therefore the total weight removed was 4.26 grams.

| | |
|---|---|
| Water/asphalt | 54.2 grams |
| + Sponge alone | + 0.14 grams |
| − Sponge/asphalt/water | − 3.9 grams |
| − Polymerized asphalt | − 0.5 grams |
| | 49.94 grams (Theoretical weight) |
| − Weight of tray after 17 hours | −48.60 grams (Actual Weight) |
| Difference | 1.34 grams |

EXAMPLE 7

A gelatin sponge weighing 0.1 grams was added to 10% asphalt in water emulsion. The solution and sponge were left over night (approximately 18 hours). Although no measurements were taken, the asphalt had been visibly absorbed into the gelatin sponge.

EXAMPLE 8

Sponges of the following type and weight were saturated with an amount of oil and formed semi-solid gels as listed in Table 3.

TABLE 3

| Sponge Type | Sponge Mass (g) | Oil Absorbed (g) | Oil Type | Efficiency (Oil Absorbed (g) Sponge Mass (g)) |
|---|---|---|---|---|
| Collagen | 0.11 | 9.11 | #3 | 83 |
| Collagen | 0.17 | 12.90 | #6 | 76 |

EXAMPLE 9

One collagen sponge weighing 0.14 grams was added to 40 grams of sea water and 6.8 grams of #3 oil. After only five minutes, the sponge was removed and weighed 7.8 grams. All of the oil was visibly absorbed. The additional 0.86 grams of material absorbed was presumably sea water. No weight measurement was taken of the remaining sea water.

EXAMPLE 10

A collagen sponge weighing 0.18 grams was added to 4.8 grams of #6 oil in 55.3 grams of sea water. After ten minutes the sponge showed signs of oil absorption and was removed and replaced by a second collagen sponge weighing 0.13 grams. This sponge was removed after one minute, since most of the visible oil was removed from the sea water. A gelatin sponge weighing 0.17 grams was then added and removed after 20 minutes. All visible oil had been removed from the sea water.

EXAMPLE 11

The efficiency of collagen and gelatin sponges was compared to a commercially available absorbent pad sold under the name SPC pads distributed by Sorbent Products Co., Inc., Bound Brook, N.J. See Table 4.

TABLE 4

| Sponge Type | Sponge Mass (g) | Oil Absorbed (g) | Oil Type | Efficiency (Oil absorbed (g) sponge mass(g)) |
|---|---|---|---|---|
| Commercial Absorbent | 1.6 | 27.5 | #6 | 17 |
| Collagen | 0.3 | 33.2 | #6 | 110 |
| Gelatin | 0.6 | 38.9 | #6 | 65 |

EXAMPLE 12

To test the sponge absorbency on an oil spill reaching shore, 250 mls of water was added to a glass tray containing sand. This volume of water exceeded the saturation point of the sand. Fifty (50) grams of #6 oil was then added to the system.

Four sponges were added to the system; two collagen sponges weighing 0.78 and 0.3 grams respectively, two of the aforementioned commercially available absorbent pads, 1.5 grams each, and one gelatin sponge weighing 0.1 grams. The total weight removed from the system after one hour is shown in Table 5.

TABLE 5

| | Sponge Type | Sponge Mass(g) | Sponge Location | Weight of Sponges (g) |
|---|---|---|---|---|
| a. | Collagen | 0.78 | sand | a + b = 34.4 |
| b. | Collagen | 0.3 | water | a + b + e = 52.7 |
| c. | Commerical Absorbent | 1.5 | sand | |
| d. | Commercial Absorbent | 1.5 | water | c + d = 3.16 |
| e. | Gelatin | 0.1 | water | |

EXAMPLE 13

Twenty-two (22.0) grams of #6 oil was made to cover 44 square inches of water. This was the estimated "spread" coverage for such an amount of oil (approximately 2 square inches per cc of oil having a density of 0.9g/cc). An aforementioned commercially available absorbent pad weighing 3.5 grams was placed on the oil and left overnight under static conditions. When removed, the sponge weighed 19.9 grams for an efficiency of 4.7. Three collagen sponges were than added, one at a time, weighing a total of 0.34 grams followed by one gelatin sponge weighing 0.1 grams. Each sponge was removed when it appeared visibly saturated.

Absorption in this system was slower than expected, and the oil had begun to polymerize. The collagen sponge still absorbed 10.8 grams of oil for an efficiency of 31. The polymerization of the oil suggests that early contact should be made between the sponges and the oil slick. However, the collagen and gelatin sponges still performed much better than the aforementioned commercially available absorbent pads.

While the present invention has been described with respect to its various and preferred embodiments, it is not intended to limit such invention by the description given. Various alternative ways of proceeding and various embodiments not specifically described will be readily apparent to those skilled in the art, and it is intended that they be embraced within the scope of the invention, insofar as the appended claims may permit.

What is claimed is:

1. An improved process for absorbing oils selected from the group consisting of hydrocarbon oils and hydrocarbon fuels comprising the step of contacting said oils with an absorbent oleophilic biodegradable sponge material comprised of at least one essentially fat free, foamed, biodegradable natural product selected from the group consisting of animal proteins and plant polymaccharides, which material is capable of absorbing at least about thirty times its weight of oils.

2. An improved process according to claim 1 wherein said natural product is an animal protein selected from the group consisting of gelatin, collagen and egg white albumen.

3. An improved process according to claim 2 wherein said animal protein is gelatin and said sponge material remains buoyant on a liquid surface for at least two days.

4. An improved process according to claim 1 wherein said natural product is collagen.

5. An improved process according to claim 1 wherein said natural product is a plant polysaccharide and is selected from the group consisting of gum agar, gum arabic, gum kayaya, and locust beam gum.

6. An improved process of claim 1 wherein the natural product is gelatin.

7. An improved process for the separation of hydrocarbon oils and hydrocarbon fuels from admixtures with aqueous substances which comprises contacting the admixtures with at least one absorbent biodegradable sponge material comprised of at least one essentially fat free, foamed, biodegradable natural product selected from the group consisting of animal proteins and plant polysaccharides, which material is capable of absorbing at least about thirty times its weight of oils.

8. An improved process according to claim 7 wherein said natural product is comprised of an animal protein selected from the group consisting of gelatin, collagen and egg white albumen.

9. An improved process according to claim 8 wherein said animal protein is gelatin and said sponge material remains buoyant on a liquid surface for at least two days.

10. An improved process according to claim 8 wherein said natural product is collagen.

11. An improved process according to claim 7 wherein said natural product is comprised of a plant polysaccharide and is selected from the group consisting of gum agar, gum arabic, gum karaya, and locust bean gum.

12. An improved process according to claim 7 wherein said sponge material absorbs at least about fifty times its weight of oils.

13. An improved process according to claim 7 which further comprises further contacting said sponge material with at least one microorganism capable of accelerating the biodegradation of oils.

14. An improved process according to claim 7 wherein said sponge material is pretreated with at least one microorganism capable of accelerating biodegradation of the oils.

15. An improved process according to claim 7, wherein the natural product is gelatin.

* * * * *